US008739223B2

(12) United States Patent
Choi et al.

(10) Patent No.: US 8,739,223 B2
(45) Date of Patent: May 27, 2014

(54) METHOD AND APPARATUS FOR PROCESSING AUGMENTED BROADCAST CONTENT USING AUGMENTATION REGION INFORMATION

(71) Applicant: Electronics and Telecommunications Research Institute, Daejeon-si (KR)

(72) Inventors: Bum-Suk Choi, Daejeon-si (KR);
Jeoung-Lak Ha, Daejeon-si (KR);
Soon-Choul Kim, Daejeon-si (KR);
Jung-Hak Kim, Daejeon-si (KR);
Young-Ho Jeong, Daejeon-si (KR);
Jin-Woo Hong, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/870,131

(22) Filed: Apr. 25, 2013

(65) Prior Publication Data

US 2013/0291023 A1    Oct. 31, 2013

(30) Foreign Application Priority Data

Apr. 25, 2012   (KR) .................. 10-2012-0043445
Apr. 22, 2013   (KR) .................. 10-2013-0044447

(51) Int. Cl.
*G06F 13/00* (2006.01)
*G06F 3/00* (2006.01)
*H04N 5/445* (2011.01)

(52) U.S. Cl.
USPC ............. 725/49; 725/403; 725/41; 725/42; 725/43; 725/51; 725/52; 725/59; 725/100; 725/110; 725/131; 725/139

(58) Field of Classification Search
USPC ............. 725/40–43, 49, 51–52, 59, 100, 110, 725/131, 139
See application file for complete search history.

(56) References Cited

U.S. PATENT DOCUMENTS

| 2009/0172746 A1* | 7/2009 | Aldrey et al. .............. 725/61 |
| 2012/0177067 A1* | 7/2012 | Cho et al. .................. 370/503 |
| 2012/0240177 A1* | 9/2012 | Rose ........................... 725/116 |
| 2012/0291073 A1* | 11/2012 | Friedman ................... 725/62 |

FOREIGN PATENT DOCUMENTS

| KR | 10-0789380 B1 | 12/2007 |
| KR | 1020110057298 B1 | 6/2011 |
| KR | 1020120004320 A | 1/2012 |
| KR | 10-1159420 B1 | 6/2012 |

* cited by examiner

*Primary Examiner* — Mulugeta Mengesha
(74) *Attorney, Agent, or Firm* — Ladas & Parry LLP (57) ABSTRACT

Provided is a method for processing augmented broadcast content, and the method includes receiving, from a broadcast content provider, broadcast content and augmentation region information required to composite augmented content to an augmentation region in the broadcast content; receiving, from a user input device, selection information necessary to select one out of a plurality of augmented content providers; generating an augmented content request message based on the augmentation region information, and transmitting the augmentation content request message to an augmented content provider selected based on the selection information; receiving the augmented content from the augmented content provider; and compositing the augmented content to the augmentation region in the broadcast content by using the augmentation region information.

16 Claims, 4 Drawing Sheets

FIG. 4

METHOD AND APPARATUS FOR PROCESSING AUGMENTED BROADCAST CONTENT USING AUGMENTATION REGION INFORMATION

CROSS-REFERENCE TO RELATED APPLICATION

This application claims the benefit under 35 U.S.C. §119(a) of Korean Patent Application Nos. 10-2012-0043445, filed on Apr. 25, 2012, and 10-2013-0044447, filed on Apr. 22, 2013, the entire disclosure of which is incorporated herein by reference for all purposes.

BACKGROUND

1. Field

The following description relates to a technology for providing interactive augmented broadcast service, and, more particularly, an apparatus and a method for processing augmented content using augmentation region information.

2. Description of the Related Art

An augmented broadcasting service is a broadcasting service by which a broadcasting program is mixed with augmented content (or augmented reality content) seamlessly so that a user is able to feel a more vivid sense of reality and selectively receive broadcasting services. In this regard, the augmented broadcasting service is a far cry from a conventional digital TV broadcasting service which is designed to provide a user with a non-interactive broadcasted program.

The conventional augmented broadcasting service is used to provide a user with a broadcast program, which has been composited with augmented content, in a unidirectional way. As a result, there is no room for a user to select augmented content.

In addition, the conventional service obtains an object existing in a broadcasting image from a broadcast receiver and displays augmented content corresponding to the obtained object, requiring the broadcast receiver to have a complex structure.

SUMMARY

In order to guarantee a user's choice for selecting augmented content when providing an augmented broadcasting service, the following description relates to an apparatus and a method for processing augmented broadcast content based on selection information of a user.

In addition, in order to provide augmented broadcasting service using a broadcast receiver with a simpler structure, the following description relates to an apparatus and a method for processing augmented broadcast content using MPEG-4 binary format for scene (BIFS) is based augmentation region information which is generated in a broadcasting service provider.

In one general aspect of the present invention, a method for processing augmented broadcast content is provided, and the method includes receiving, from a broadcast content provider, broadcast content and augmentation region information required to composite augmented content to an augmentation region in the broadcast content; receiving, from a user input device, selection information necessary to select one out of a plurality of augmented content providers; generating an augmented content request message based on the augmentation region information, and transmitting the augmentation content request message to an augmented content provider selected based on the selection information; receiving the augmented content from the augmented content provider; and compositing the augmented content to the augmentation region in the broadcast content by using the augmentation region information.

The method may further include, if the broadcast content and the augmentation region information are received from the broadcast content provider, generating notification information to inform a user that an augmented broadcast service is available.

The augmentation region information may be information about MPEG-4 BIFS nodes relative to the augmentation region.

The augmentation region information may be information generated by the broadcast content provider.

The augmentation region information may include at least one of location information of the augmentation region, time information of the augmentation region, and information on how to composite the augmented content.

The augmentation region information may further include augmented content search information required to search for the augmented content in the augmented content provider.

The augmented content request message may include the augmented content search information obtained from the augmentation region information.

The augmented content search information may be information about a type and attributes of the augmented content.

In another general aspect of the present invention, an apparatus for processing augmented broadcast content is provided, and the apparatus includes a broadcast content receiving unit configured to receive, from a broadcast content provider, broadcast content and augmentation region information to composite augmented content to an augmentation region in the broadcast content; a selection information receiving unit configured to receive, from a user input device, selection information necessary to select one out of a plurality of augmented content providers; an augmented content requesting unit configured to generate an augmented content request message based on the augmentation region information and transmit the augmented content request message to an augmented content provider selected based on the selection information; an augmented content receiving unit configured to receive augmented content from the augmented content provider; and an augmented content compositing unit configured to composite the augmented content to the augmentation region in the broadcast content by using the augmentation region information.

The apparatus may further include a notification information generating unit configured is to, if the broadcast content and the augmentation region information is received from the broadcast content provider, generate notification information to inform a user that an augmented broadcast service is available.

The augmentation region information may be information about MPEG-4 BIFS nodes relative to the augmentation region.

The augmentation region information may be information generated by the broadcast content provider.

The augmentation region information may include at least one of location information of the augmentation region, time information of the augmentation region, and information on how to composite the augmented content.

The augmentation region information may further include augmentation content search information necessary to search the augmented content in the augmented content provider.

The augmented content request message may include the augmented content search information obtained from the augmentation region information.

The augmented content search information may be information about a type and attributes of the augmented content.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
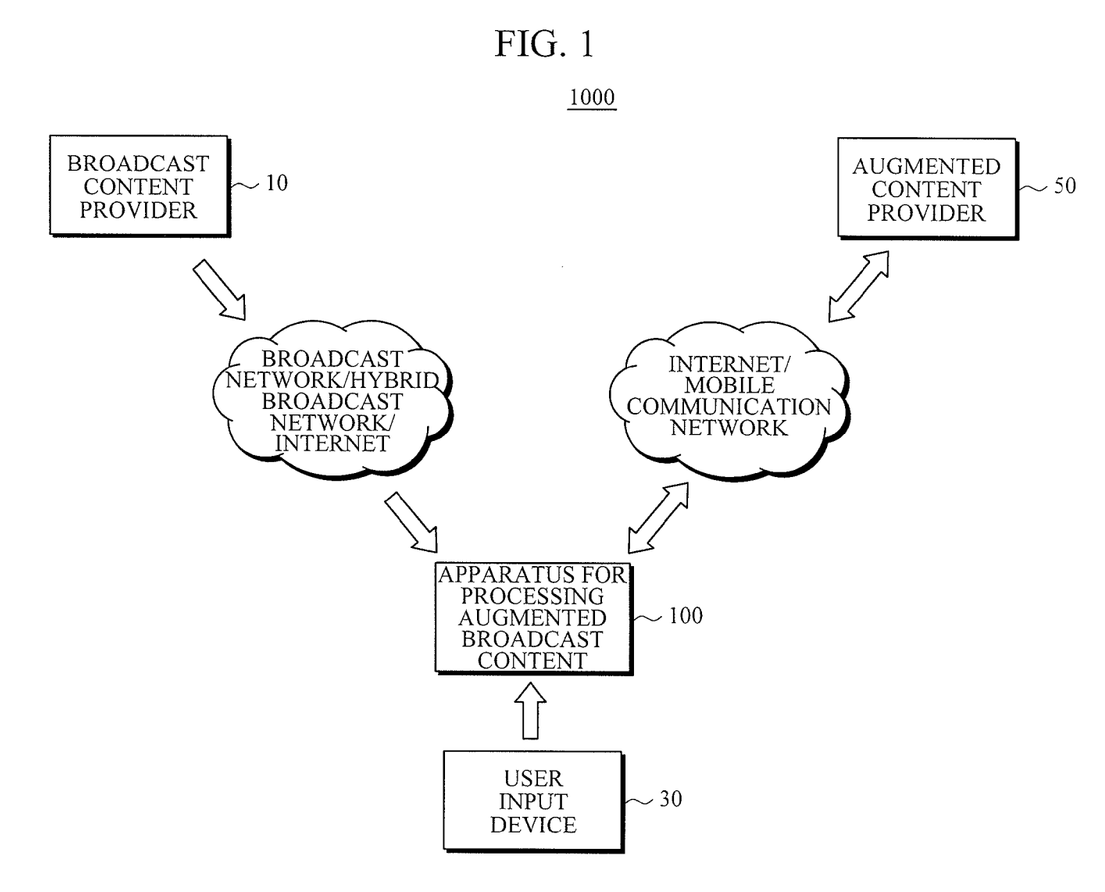
FIG. 1 is a diagram illustrating a configuration of an augmented broadcasting service system according to an exemplary embodiment of the present invention.

FIG. 1 is a diagram illustrating a configuration of an augmented broadcasting service system according to an exemplary embodiment of the present invention.

Referring to FIG. 1, the augmented broadcasting service system 1000 includes an apparatus 10 for providing broadcast content, a user input device 30, an augmented content provider 50 and an apparatus 100 for processing augmented broadcast content.

In FIG. 1, the augmented broadcasting service system 1000 includes a single augmented content provider 50 for the sake of convenience, but the augmented broadcasting service system 1000 may include a plurality of augmented content providers 50 run by augmented reality content service providers.

The augmented broadcasting service system 1000 illustrated in FIG. 1 may provide various pieces of broadcast content on education, advertising, games, maps and Social Network Service (SNS) in a bidirectional way, by using broadcast content which is transmitted via a broadcasting net or the Internet.

For starters, the broadcast content provider 10 generates augmentation region information required to composite augmented content with an augmentation region of the broadcast content, by analyzing the broadcast content, multiplexes the augmentation region information to the broadcast content, and transmits the broadcast content multiplexed with augmentation region information to the apparatus 100 for processing augmented broadcast content. Here, the broadcast content provider 10 schedules transmission of the broadcast content and the augmented content such that the broadcast content and the augmented content are synchronously displayed in the apparatus 100 for process augmented broadcast content.

Here, the augmentation region refers to a specific region in the broadcast content with which the augmented content is to be composited. The augmentation region information may be information about MPEG-4 BIFS nodes relative to the augmentation region. The augmentation region and the augmentation region information will be described in detail with reference to Tables 1 and 2. In addition, the augmentation region information may include at least one of location information about the augmentation region, time information of the augmentation region and information on how to composite the augmented content. The augmentation region information may further include augmented content search information.

The broadcast content provider 10 may transmit the broadcast content and the augmentation region information to the apparatus 100 for processing augmented broadcast content via a broadcast network or a hybrid broadcast network. In another example, the broadcast content provider 10 may transmit the broadcast content via a broadcast network or a hybrid broadcast network and the augmentation region information via the Internet to the apparatus 100 for processing augmented broadcast content. In addition, the broadcast content provider 10 may transmit the augmentation region information to the augmented content provider 50.

The broadcast content provider 10 may be a broadcast transmitting/receiving system run by a broadcast service provider.

The user input device 30 generates selection information necessary to select one out of a plurality of augmented content providers 50 in response to a user's input, and transmits the generated selection information to the apparatus 100 for processing augmented broadcast content.

The user input device 30 illustrated in FIG. 1 may be a configuration element composing the apparatus 100 for processing augmented broadcast content. In another embodiment, the user input device 30 may be a remote controller which works in association with the apparatus 100 for processing augmented broadcast content. For example, the user input device 30 may be a remote controller of a smart TV or the Internet Protocol Television (IPTV). In another embodiment, the user input device 30 may be a mobile device which works in association with the apparatus 100 for processing augmented broadcast content. For example, the user input device 30 may be a smart phone, a mobile phone or a Personal Digital Assistant (PDA).

Next, the augmented content provider 50 receives an augmented content request message from the apparatus 100 for processing augmented broadcast content, performs parsing on the received message, searches a database for augmented content based on the parsed message, and transmit the found augmented content to the apparatus 100 for processing augmented broadcast content.

Here, the augmented content request message includes augmented content search information obtained from the augmentation region information. The augmented content search information is information necessary to search the augmented content in the selected augmented content provider 50. For example, the augmented content search information may be information about a type and attributes of the augmented content.

According to another exemplary embodiment of the present invention, prior to searching for the augmented content, the augmented content provider 50 may authenticate a user or the apparatus 100 for processing augmented broadcast content.

The augmented content provider 50 may transmit the found augmented content to the apparatus 100 for processing augmented broadcast content via the Internet or a mobile communication network. In addition, the augmented content provider 50 may provide various pieces of augmented content to the apparatus 100 for processing augmented broadcast content. In one embodiment, the augmented content provider 50 may provide tourism-related augmented reality content in association with broadcast content to the apparatus 100 for processing augmented broadcast content. In another embodiment, the augmented content provider 50 may provide map-related augmented reality content in association with broadcast content to the apparatus 100 for processing augmented broadcast content.

The augmented content provider 50 may be a content storage server run by the Internet portal service provider.

Next, the apparatus 100 for processing augmented broadcast content receives broadcast content including augmentation region information from the broadcast content provider 10, receives selection information of the augmented content provider 50 from the user input device 30, generates an augmented content request message based on the augmentation region information, transmits the generated augmented content request message to the augmented content provider 50, receives augmented content from the augmented content provider 50, and composites the received augmented content to the augmentation region in the broadcast content using the augmentation region information. At this time, "compositing" may be "overlaying."

According to another exemplary embodiment of the present invention, if receiving the broadcast content including the augmentation region information from the broadcast content provider 10, the apparatus 100 for processing augmented broadcast content may generate notification information used to inform a user that an augmented broadcast service is available.

In one embodiment, the apparatus 100 for processing augmented broadcast content may be a broadcast receiving terminal capable of playing back broadcast content. For example, the apparatus 100 for processing augmented broadcast content may be an IPTV or a smart TV. In another embodiment, the apparatus 100 for processing augmented broadcast content may be a Set Top Box. For example, the apparatus 100 for processing augmented broadcast content may be a Set Top Box required to receive broadcast content through a satellite broadcast, a cable broadcast, an IPTV, an Over the Top (OTT) and a smart TV. In another embodiment, the apparatus 100 for processing augmented broadcast content may be a portable terminal capable of receiving a TV program or a Digital Multimedia Broadcasting (DMB) program. For example, the apparatus 100 for processing augmented broadcast content may be a DMB phone, a smart phone or a smart pad.

Figure 2:
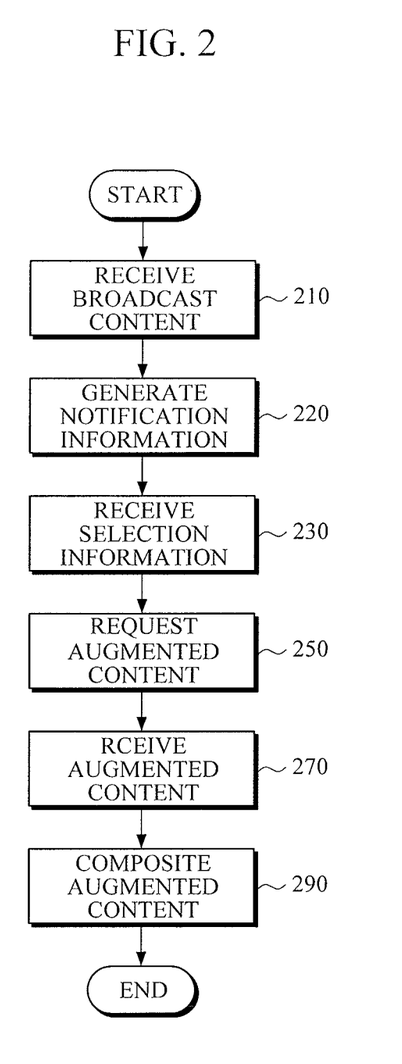
FIG. 2 is a flow chart illustrating a method for processing augmented broadcast content according to an exemplary embodiment of the present invention.

FIG. 2 is a flow chart illustrating a method for processing augmented broadcast content according to an exemplary embodiment of the present invention.

Referring to FIG. 2, the method for processing augmented broadcast content includes an operation 210 for receiving broadcast content, an operation 230 for receiving selection information, an operation 250 for requesting augmented content, an operation 270 for receiving augmented content and an operation 290 for compositing augmented content.

For starters, the operation for receiving broadcast content is to receive, from a broadcast content provider 10, broadcast content and augmentation region information in 210. Here, the augmentation region indicates a specific region in the broadcast content to be composited with the augmented content. The augmentation region information may be information about MPEG-4 BIFS nodes relative to the augmentation region. The above will be described in detail with reference to Tables 1 and 2.

Table 1 is an XSD Description about nodes relative to an augmentation region, whereas Table 2 is a MPEG-4 BIFS Textual Description about nodes relative to the augmentation region.

TABLE 1

```
<ProtoDeclare name="AugmentationRegion"
locations="org:mpeg:augmentationregion">
  <field name="source" type="Strings" vrml97Hint="exposedField"
stringArrayValue=" "/>
  <field name="region" type="Vector3Array" vrml97Hint="exposedField"
vector3ArrayValue=" "/>
  <field name="arProvider" type="Strings" vrml97Hint="exposedField"
stringArrayValue=" "/>
  <field name="enabled" type ="Boolean" vrml97Hint="exposedField"
booleanValue="false"/>
  <field name="translation"
  type="Vector3Array" vrml97Hint="exposedField"
Vector3ArrayValue=" "/>
<field name="rotation" type="Rotations" vrml97Hint="exposedField"
rotationArrayValue=" "/>
<field name="scale" type="Vector3"
vrml97Hint="exposedField" Vector3Value="1 1 1"/>
  <field name="onTranslationChanged"
  type="Boolean" vrml97Hint="eventOut"/>
<field name="onRotationChanged"
type="Boolean" vrml97Hint="eventOut"/>
<field name="onScaleChanged"
type="Boolean" vrml97Hint="eventOut"/>
  <field name="onARProviderChanged"
  type ="Boolean" vrml97Hint="eventOut"/>
  <field name="onError" type="Integer" vrml97Hint="eventOut"/>
</ProtoDeclare>
```

TABLE 2

```
EXTERNPROTO AugmentationRegion[
    exposedField   MFString      source                []
    exposedField   MFVec3f       region                []
    exposedField   MFString      arProvider            []
    exposedField   SFBool        enabled               FALSE
    exposedField   MFVec3f       translation           []
    exposedField   MFRotation    rotation              []
    exposedField   SFVec3f       scale         1, 1, 1
    eventOut       SFBool        onTranslationChanged
    eventOut       SFBool        onRotationChanged
    eventOut       SFBool        onScaleChanged
    eventOut       SFBool        onARProviderChanged
    eventOut       SFInt32       onError
] "org:mpeg:AugmentationRegion"
```

With reference to Tables 1 and 2, the AugmentationRegion prototype provides the parameters of a static or animated 2D or 3D region related to a natural media. A virtual object can therefore be composed with the natural media and contained inside the region.

The exposed field source specifies the media source where the augmentation will be realized. The source media could be 2D or 3D The exposed field region specifies a 2D or 3D shape by means of x, y, z array of points relative to the source coordinate system. The order of the points is sequencely along the contour. Note that when used with 2D source media, the z component of 3D vector is discarded.

The exposed field arProvider specifies the URI where the virtual object is available.

The exposed field enabled specifies whether the augmentation is performed. When it is set to FALSE, the augmentation region should not be displayed.

The exposed field translation specifies the translation of the region. The valid values are the ones that are enabled by the on TranslationChanged mask. Note that when used with 2D source media, the z component of 3D vector is discarded.

The exposed field rotation specifies the rotation of the region. The valid values are the ones that are enabled by the on RotationChanged mask. Note that when used with 2D source media, the z component of 3D vector is discarded.

The exposed field scale specifies the scale of the region. The valid values are the ones that are enabled by the on ScaleChanged mask. Note that when used with 2D source media, the z component of 3D vector is discarded.

The event out on TranslationChanged is set each time the translation of the region is to be performed.

The event out on RotationChanged is set each time the rotation of the region is to be performed.

The event out on ScaleChanged is set each time the scale of the region is to be performed.

The event out on ARProviderChanged is set each time the AR provider is changed.

The event out onError is set when an error occurs in the augmentation process. Currently the following error codes are defined:

0—No error.

1—the url for arProvider is not providing a valid virtual object.

2—Unspecified error.

In addition, the augmentation region information may include at least one of location information about an augmentation region, time information of the augmentation region, and information on how to composite the augmented content. In addition, the augmentation region information may further include augmented content search information required to search for the augmented content in an augmented content provider.

Next, the operation for receiving selection information is to receive, from a user input device 30, selection information necessary to select one out of a plurality of augmented content providers 50 in 230.

Next, the operation for requesting augmented content is to generate an augmented content request message based on the augmentation region information and transmit the augmented content request message to the selected augmented content provider 50 in 250. Here, the augmented content request message includes augmented content search information obtained from the augmentation region information. Here, the augmented content search information indicates information required to search for the augmented content in the selected augmented content provider 50. For example, the augmented content search information may be information about a type and attributes of the augmented content.

Next, the operation for receiving augmented content is to receive the augmented content from the augmented content provider 50 in 270. Here, the augmented content may be received via the Internet or a mobile communication network.

Next, the operation for compositing augmented content is to composite the augmented content to an augmentation region in a broadcast program using the augmentation region information in 290. That is, the augmented content is composited to the augmentation region in the broadcast program based on the location information of the augmentation region, time information of the augmentation information, and information on how to composite the augmented content. Here, the location information of the augmentation region, the time information of the augmentation information, and the information on how to composite the augmented content are included in the augmentation region information. At this time, "compositing" may be "overlaying." In addition, in the operation 290 for compositing augmented content with the augmentation region, synchronization and two- or three-dimensional rendering may be performed on the augmented content based on the augmentation region information in order to composite the augmented content to the broadcast content seamlessly.

According to another exemplary embodiment of the present invention, the method for providing augmented broadcast service includes an operation 210 for receiving broadcast content, an operation 220 for generating notification information, an operation 230 for receiving selection information, an operation 250 for requesting augmented content, an operation 270 for receiving augmented content and an operation 290 for compositing augmented content. That is, in another embodiment, the method for providing augmented broadcast service may further include the operation 220 for generating notification information.

Since the operation 210 for receiving broadcast content, the operation 230 for receiving selection information, the operation 250 for requesting augmented content, the operation 270 of receiving augmented content and the operation 290 for compositing augmented content are the same as described above, only the operation 220 for generating notification information will be described in detail hereinafter.

The operation for generating notification information is to, if the broadcast content including the augmentation region information is received from the broadcast content provider 10, generate notification information to inform a user that the augmented broadcast service is available in 220. That is, it is possible to provide a user with information on whether the augmented broadcast service is available and with relevant information. Accordingly, the user is able to enjoy the augmented broadcast service by selecting a desired augmented content provider.

Figure 3:
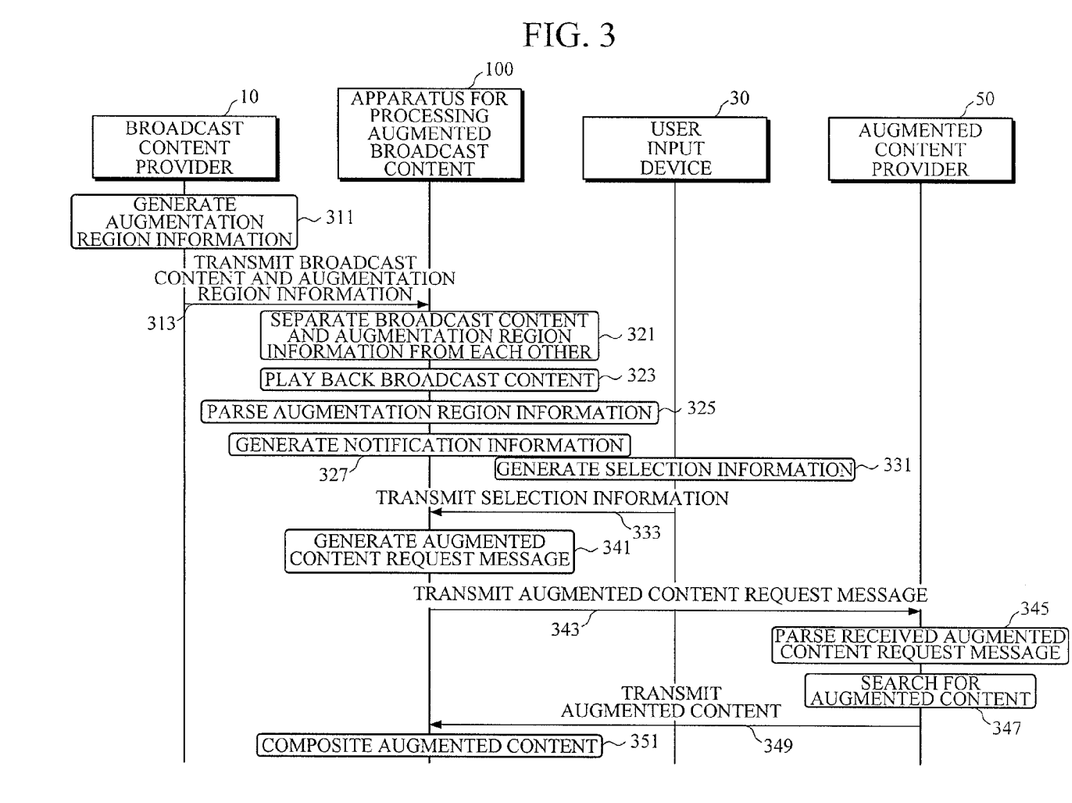
FIG. 3 is a flow chart illustrating a procedure for providing an augmented broadcasting service according to an exemplary embodiment of the present invention.

FIG. 3 is a flow chart illustrating a procedure for providing an augmented broadcast service according to an exemplary embodiment of the present invention.

Hereinafter, a overall procedure for providing an augmented broadcast service in an augmented broadcast service system 1000 will be described in detail with reference to FIG. 3.

For starters, a broadcast content provider generates augmentation region information required to composite augmented content to a specific region in broadcast content, by analyzing the broadcast content in 311. Here, the augmentation region information may be information about MPEG-4 BIFS nodes relative to the augmentation region. In addition, the augmentation region information may include at least one of location information of an augmentation region, time information of the augmentation region, and information on how to composite the augmented content. In addition, the augmentation region information may further include augmented content search information required to search for the augmented content in the augmented content provider.

In addition, the broadcast content provider 10 multiplexes the augmentation region information with the broadcast content, and transmits the broadcast content multiplexed with the augmentation region information to an apparatus 100 for processing augmented broadcast content. In one embodiment of the present invention, the broadcast content provider 10 may transmit the broadcast content and the augmentation region information to the apparatus 100 via a broadcast network and a hybrid broadcast network. In another exemplary embodiment, the broadcast content provider 10 may transmit the broadcast content via a broadcast network or a hybrid broadcast network to the apparatus 100, while transmitting the augmentation region information via the Internet.

Next, the apparatus 100 separates the received broadcast content into a broadcast program and the augmentation region information in 321. In addition, the apparatus 100 plays back the broadcast program using a decoder. Here, the decoder may be a well-known decoder which is used to plays back a broadcast program.

In addition, the apparatus 100 parses the augmentation region information. That is, the apparatus 100 analyzes the received augmentation region information to thereby obtain location information of the augmentation region, time information of the augmentation region, and information on how to composite the augmented content in 325. In addition, the apparatus 100 may further obtain augmented content search information.

In addition, the apparatus 100 generates notification information to inform a user that an augmented broadcast service is available in 327.

Next, the user input device 30 generates selection information necessary to select one out of a plurality of augmented content providers 50 in response to a user's input in 331. In addition, the user input device 30 transmits the generated selection information to the apparatus 100 in 333.

Next, the apparatus 100 generates an augmented content request message based on the augmentation region information in 341. Here, the augmented content request message includes the augmented content search information obtained from the augmentation region information. Here, the augmented content search information may be information about a type and attributes of the augmented content. In addition, the apparatus 100 transmits the augmented content request message to the selected augmented content provider 50 in 343.

Next, the augmented content provider 50 parses the augmented content request message in 345. That is, the augmented content provider 50 analyzes the received augmented content request message to obtain the augmented content search information in 345. Here, the augmented content search information may be information about a type and attributes of the augmented content.

Next, the augmented content provider 50 searches a database for the augmented content based on the augmented content search information in 347. Then, the augmented content provider 50 transmits the found augmented content to the apparatus 100 in 349. At this time, the augmented content provider 50 may transmit the found augmented content via the Internet or a mobile communication network to the apparatus 100.

In addition, prior to parsing the augmented content request message, the augmented content provider 50 may perform authentication with respect to the augmented content request message (not illustrated). That is, the augmented content provider 50 may authenticate a user or the apparatus 100, who or which requests the augmented content, based on authentication-related information contained in the received augmented content request message.

Next, the apparatus 100 composites the augmented content with an augmentation region in a broadcast program, which is currently being played back, using the augmentation region information in 351. That is, the apparatus 100 composites the augmented content to the augmentation region in the broadcast program based on location information of the augmentation region, time information of the augmentation region, and information on how to composite the augmented content. Here, the location information of the augmentation region, the time information of the augmentation region, and the information on how to composite the augmented content are included in the augmentation region information. At this time, "compositing" may be "overlaying." In addition, in the operation for compositing augmented content with the augmentation region, synchronization and two- or three-dimensional rendering may be performed on the augmented content based on the augmentation region information in order to composite the augmented content to the broadcast program seamlessly.

Figure 4:
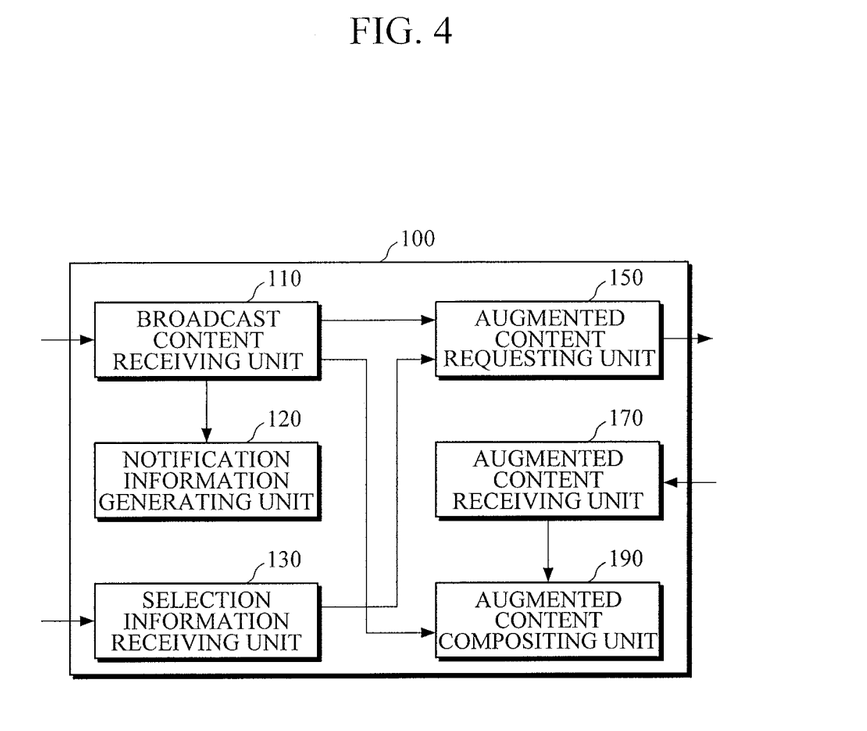
FIG. 4 is a diagram illustrating a configuration of an apparatus for processing augmented broadcast content according to an exemplary embodiment of the present invention.

FIG. 4 is a diagram illustrating a configuration of an apparatus for processing augmented broadcast content according to an exemplary embodiment of the present invention.

Referring to FIG. 4, the apparatus 100 for processing augmented content includes a broadcast content receiving unit 110, a selection information receiving unit 130, an augmented content requesting unit 150, an augmented content receiving unit 170 and an augmented content compositing unit 190.

For starters, the broadcast content receiving unit 110 receives, from a broadcast content provider 10, broadcast content and augmentation region information required to composite augmented content to an augmentation region in the broadcast content. Here, the augmentation region indicates a specific region in the broadcast content with which the augmented content is to be composited.

The augmentation region information may be information about MPEG-4 BIFS nodes relative to the augmentation region, as described above with reference Tables 1 and 2. In addition, the augmentation region information may include at least one of location information of the augmentation region, time information of the augmentation region, and information on how to composite the augmented content. In addition, the augmentation region information may further include augmented content search information required to search for the augmented content in an augmented content provider.

Next, the selection information receiving unit 130 receives, from the user input device 30, selection information necessary to select one out of a plurality of augmented content providers 50. Here, the user input device 30 may be a configuration element composing the apparatus 100.

Next, the augmented content request unit 150 generates an augmented content request message based on the augmentation region information, and transmits the augmented content request message to the selected augmented content provider 50. Here, the augmented content request message includes augmented content search information obtained from the augmentation region information, and the augmented content search information indicates information required to search for the augmented content in the selected augmented content provider 50. For example, the augmented content search information may be information about a type and attributes of the augmented content.

Next, the augmented content receiving unit 170 receives the augmented content from the augmented content provider 50. Here, the augmented content receiving unit 170 may receive the augmented content via the Internet or a mobile communication network.

Next, the augmented content compositing unit 190 composites the augmented content to the augmentation region in the broadcast program using the augmentation region information. That is, the augmented content compositing unit 190 composites the augmented content to the augmentation region in the broadcast program based on the location information of the augmentation region, the time information of the augmentation region, and the information on how to composite the augmented content. Here, the location information of the augmentation region, the time information of the augmentation region, and the information on how to composite the augmented content are included in the augmentation region information. At this time, "compositing" may be "overlaying." In addition, in the operation for compositing augmented content with the augmentation region, synchronization and two- or three-dimensional rendering may be performed on the augmented content based on the augmentation region information in order to composite the augmented content to the broadcast program seamlessly.

In another embodiment, the apparatus 100 for processing augmented broadcast content includes a broadcast content receiving unit 110, a notification information generating unit 120, a selection information receiving unit 130, a augmented content requesting unit 150, a augmented content receiving unit 170 and a augmented content compositing unit 190. That is, the apparatus 100 may further include the notification information generating unit 120.

Since each of the broadcast content receiving unit 110, the selection information receiving unit 130, the augmented content requesting unit 150, the augmented content receiving unit 170 and the augmented content compositing unit 190 works in the same way as described above, only the notification information generating unit 120 will be described in detail in following.

If receiving the broadcast content including the augmentation region information from the broadcast content provider 10, the notification information generating unit 120 generates notification information to inform a user that an augmented broadcast service is available. That is, it is possible to provide a user with information on whether an augmented broadcast service is available and with relevant information. In this manner, the user is able to enjoy the augmented broadcast service by selecting a desired augmented content provider.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for processing augmented broadcast content, the method comprising:
    receiving, from a broadcast content provider, broadcast content and augmentation region information required to composite augmented content to an augmentation region in the broadcast content;
    receiving, from a user input device, selection information necessary to select one out of a plurality of augmented content providers;
    generating an augmented content request message based on the augmentation region information, and transmitting the augmentation content request message to an augmented content provider selected based on the selection information;
    receiving the augmented content from the augmented content provider; and
    compositing the augmented content to the augmentation region in the broadcast content by using the augmentation region information.

2. The method of claim 1, further comprising:
    if the broadcast content and the augmentation region information are received from the broadcast content provider, generating notification information to inform a user that an augmented broadcast service is available.

3. The method of claim 1, wherein the augmentation region information is information about MPEG-4 BIFS nodes relative to the augmentation region.

4. The method of claim 1, wherein the augmentation region information is information generated by the broadcast content provider.

5. The method of claim 1, wherein the augmentation region information comprises at least one of location information of the augmentation region, time information of the augmentation region, and information on how to composite the augmented content.

6. The method of claim 5, wherein the augmentation region information further comprises augmented content search information required to search for the augmented content in the augmented content provider.

7. The method of claim 6, wherein the augmented content request message comprises the augmented content search information obtained from the augmentation region information.

8. The method of claim 6, wherein the augmented content search information is information about a type and attributes of the augmented content.

9. An apparatus for processing augmented broadcast content, the apparatus comprising:
    a broadcast content receiving unit configured to receive, from a broadcast content provider, broadcast content and augmentation region information to composite augmented content to an augmentation region in the broadcast content;
    a selection information receiving unit configured to receive, from a user input device, selection information necessary to select one out of a plurality of augmented content providers;
    an augmented content requesting unit configured to generate an augmented content request message based on the augmentation region information and transmit the augmented content request message to an augmented content provider selected based on the selection information;
    an augmented content receiving unit configured to receive augmented content from the augmented content provider; and
    an augmented content compositing unit configured to composite the augmented content to the augmentation region in the broadcast content by using the augmentation region information.

10. The apparatus of claim 9, further comprising:
    a notification information generating unit configured to, if the broadcast content and the augmentation region information is received from the broadcast content provider, generate notification information to inform a user that an augmented broadcast service is available.

11. The apparatus of claim 9, wherein the augmentation region information is information about MPEG-4 BIFS nodes relative to the augmentation region.

12. The apparatus of claim 9, wherein the augmentation region information is information generated by the broadcast content provider.

13. The apparatus of claim 9, wherein the augmentation region information comprises at least one of location information of the augmentation region, time information of the augmentation region, and information on how to composite the augmented content.

14. The apparatus of claim 13, wherein the augmentation region information further comprises augmentation content search information necessary to search the augmented content in the augmented content provider.

15. The apparatus of claim 14, wherein the augmented content request message comprises the augmented content search information obtained from the augmentation region information.

16. The apparatus of claim 14, wherein the augmented content search information is information about a type and attributes of the augmented content.

\* \* \* \* \*